US006814385B2

(12) United States Patent
Fujiwara

(10) Patent No.: US 6,814,385 B2
(45) Date of Patent: Nov. 9, 2004

(54) MOLDED ARTICLES FOR VEHICLES

(75) Inventor: Kazuhiro Fujiwara, Obu (JP)

(73) Assignee: Tokai Kogyo Co., Ltd., Obu (JP)

( * ) Notice: Subject to any disclaimer, the term of this patent is extended or adjusted under 35 U.S.C. 154(b) by 0 days.

(21) Appl. No.: 10/270,631

(22) Filed: Oct. 16, 2002

(65) Prior Publication Data
US 2003/0075947 A1 Apr. 24, 2003

(30) Foreign Application Priority Data
Oct. 22, 2001 (JP) ......................... 2001-324022

(51) Int. Cl.[7] .............................. B60J 10/02; B60J 1/18
(52) U.S. Cl. ................. 296/93; 276/146.2; 276/146.15; 276/201
(58) Field of Search ............................. 296/14.1, 201, 296/190.1, 93–146.3

(56) References Cited

U.S. PATENT DOCUMENTS

| 5,001,876 A | * | 3/1991 | Harper et al. ................. 52/208 |
| 5,248,179 A | * | 9/1993 | Biermacher et al. .......... 296/93 |
| 5,553,423 A | * | 9/1996 | Kato ....................... 52/204.597 |
| 5,603,546 A | * | 2/1997 | Desir, Sr. ...................... 296/93 |
| 5,752,352 A | * | 5/1998 | Goto et al. .................... 296/93 |
| 5,779,297 A | * | 7/1998 | Flauss .......................... 296/93 |
| 6,095,586 A | * | 8/2000 | Yada et al. .................... 296/93 |
| 6,227,598 B1 | * | 5/2001 | Ichioka et al. ................ 296/93 |
| 6,238,769 B1 | * | 5/2001 | Nishio et al. ................. 296/93 |
| 6,332,640 B1 | * | 12/2001 | Cornils et al. ................ 296/93 |
| 6,460,300 B2 | * | 10/2002 | Mikkaichi et al. ........... 296/93 |
| 6,487,823 B2 | * | 12/2002 | Lagrue ......................... 296/93 |
| 2003/0090122 A1 | * | 5/2003 | Meizlish ...................... 296/93 |

FOREIGN PATENT DOCUMENTS

| JP | 405338438 | * 12/1993 | ................. 293/93 |
| JP | 406099734 | *  4/1994 | ................. 296/93 |

* cited by examiner

Primary Examiner—D. Glenn Dayoan
Assistant Examiner—H. Gutman
(74) Attorney, Agent, or Firm—Oliff & Berridge, PLC

(57) ABSTRACT

Molded articles (10, 10') are designed to be received within a space (S) between a window frame (2) of a vehicle body panel (1) and a window panel (7) attached thereto. The molded articles may include a molding body (11) arranged and constructed to partially contact the window panel when the molded article is received within the space. The molded article further may include an elastic lip (30) continuously extending from the molding body and arranged and constructed to partially elastically contact the window frame and to elastically deform when the molded article is received within the space. Moreover, a connecting strip (31) may continuously extend between the elastic lip and the molding body. The connecting strip is preferably arranged and constructed to apply a force to a portion of the molding body when the elastic lip is elastically deformed.

11 Claims, 10 Drawing Sheets

MOLDED ARTICLES FOR VEHICLES

This application claims priority to Japanese Patent Application Serial Number 2001-324022, the contents of which are incorporated herein by reference.

BACKGROUND OF THE INVENTION

1. Field of the Invention

The present invention relates to molded articles (moldings) that are designed to be disposed around window panels for a vehicle and to window panels, in which a molded article has been disposed thereon (hereinafter "window panel units").

2. Description of the Related Art

A window panel for a vehicle is typically received within a shouldered window frame that is defined around a window opening formed in a body panel of the vehicle. Generally, in order to shield or cover a clearance between the periphery of the window panel and the window frame, a strip-like resin molded article is attached to the window panel along the periphery of the window panel. Examples of such window panels include a front windowpane (windshield) and a rear windowpane, and examples of the molded article include window moldings (e.g., a weather strip).

As shown in FIG. 9, a known window molding 110 for a vehicle includes a head portion 112, a leg portion 121, an engagement portion 122 and an elastic lip portion 130, which portions are integrally molded. The window molding 110 is adapted to closely receive the peripheral edge of a window panel 107 between the head portion 112 and the engagement portion 122 in order to securely attach the molding 110 to the window panel 107.

However, because the head portion 112 of such window molding 110 has an inherent height or thickness H, the head portion 112 projects from an outer surface 107c of the window panel 107 over the height H. Consequently, a step is formed between the window panel outer surface 107c and the window molding 110. Therefore, the window molding 110 was not designed so that an upper or ornamental surface 113 of the head portion 112 is flush with the window panel outer surface 107c. As a result, such window molding 110 cannot be used for vehicles that require excellent aerodynamic performance or other such characteristics.

As shown in FIG. 10, window molding 210 for a vehicle has been previously invented by the present inventor in order to reduce drawbacks of the known window molding shown in FIG. 9. The window molding 210 includes a head portion 212, a leg portion 221, an engagement portion 222 and an elastic lip portion 230, which portions are integrally molded. Unlike the window molding 110 shown in FIG. 9, the head portion 212 extends in the opposite direction with respect to the engagement portion 222.

In such window molding 210, the head portion 212 does not substantially extend over an outer surface 207c of a window panel 207. Therefor it is possible to design the window molding 210 such that an upper or ornamental surface 213 of the head portion 212 is substantially flush with the window panel outer surface 207c.

However, the window molding 210 thus constructed cannot be reliably or securely attached to the window panel 207, because the head portion 212 does not contact the window panel outer surface 207c. As a result, a gap may be produced between the peripheral edge of the window panel 207 and the window molding 210, which gap is not desirable. Also, the window molding 210 thus constructed may possibly slip or fall off of the window panel 207 during use.

In addition, when the window molding 210 is attached to a corner or curved portion (not shown) of the window panel 207, the head portion 212 is bent or flexed along the curvature of the window panel corner portion. As a result, compressive stresses will be produced at a radial inner side of the head portion 212. While, tensile stresses will be produced at a radial outer side of the head portion 212. When these stresses are produced in the head portion 212, corresponding restoring forces for relieving such stresses may be applied to the head portion 212. As a result, the inner side of the head portion 212 may be outwardly bent or deformed (i.e., toward the exterior of the vehicle). On the other hand, the outer side of the head portion 212 may be inwardly bent or deformed (i.e., toward the interior (cabin) of the vehicle). Such deformation of the head portion 212 may spoil an attractive appearance of the window molding 210.

Further, in some applications, an ornamental film 216 may be provided on the upper surface 213 of the head portion 212 for decorative purposes. However, if the film 216 has less flexibility, the head portion 212 may significantly deform.

SUMMARY OF THE INVENTION

It is, accordingly, one object of the present invention to provide improved molded articles for use with a vehicle. It is another object of the present invention to provide improved window panel units that include a molded article disposed around a peripheral edge of a window panel for a vehicle.

For example, in one aspect of the present invention, molded articles for a vehicle are described that may be arranged and constructed to be received within a space or clearance defined between a window frame of a vehicle body panel and a peripheral edge of a window panel disposed therein. Representative molded articles may include a molding body arranged and constructed to partially contact the window panel when the molded article is received within the space. An elastic lip preferably extends from the molding body and is arranged and constructed to partially and elastically contact the window frame. In this case, the elastic lip will elastically deform when the molded article is received within the space. Further, a connecting strip may extend between the elastic lip and the molding body. The connecting strip is preferably arranged and constructed to apply a force to a portion of the molding body when the elastic lip is elastically deformed.

Molded articles according to the present invention can be reliably secured within the space, because the connecting strip presses the molding body against the window panel when the molded article is disposed within the space or clearance between the vehicle body and the peripheral edge of the window panel. In addition, the molding body can be effectively prevented from undesirably deforming at the corners of the window panel, because the molding body may preferably forcibly supported by the connecting strip. Therefore, the present molded articles maintain an attractive appearance when disposed in the vehicle.

Other objects, features and advantage of the present invention will be readily understood after reading the following detailed description together with the accompanying drawings and the claims.

DETAILED DESCRIPTION OF THE INVENTION

Figure 1:
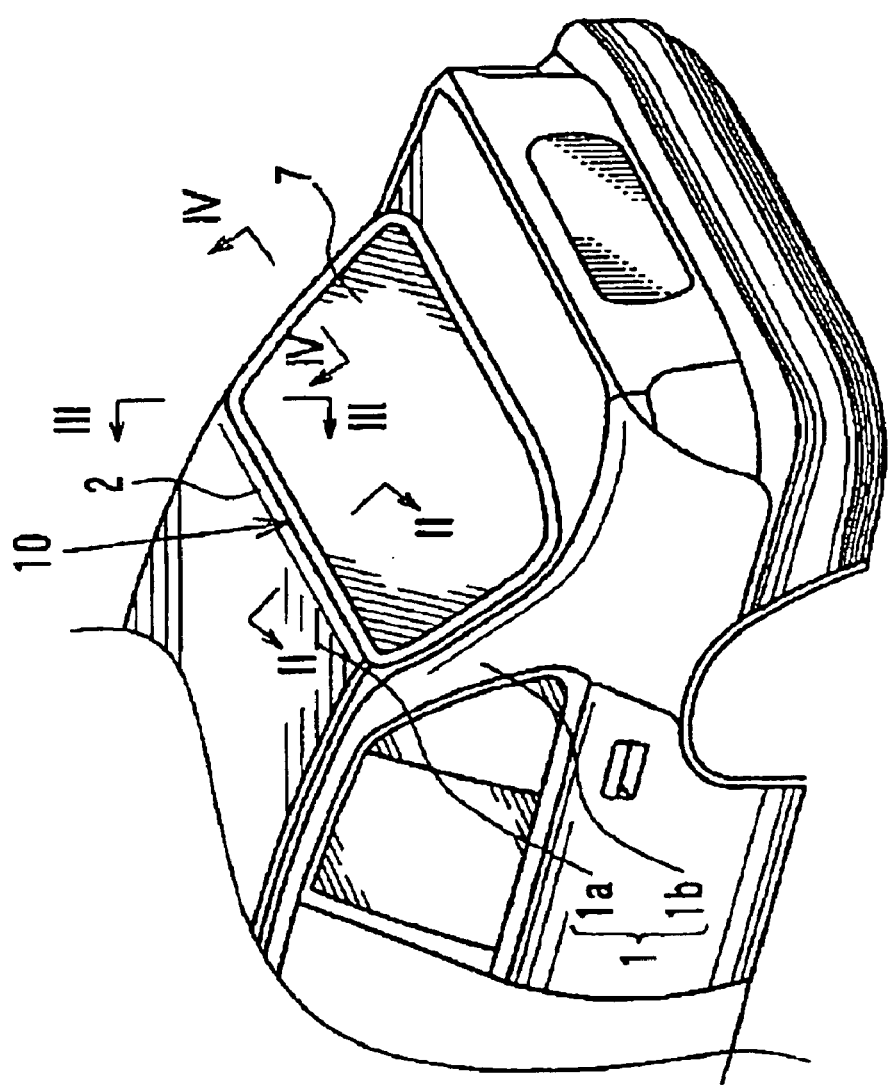
FIG. 1 is a partially perspective view of a vehicle, illustrating a rear window molding according to a first embodiment of the present invention.

Representative molded articles for use with vehicles are described herein. Further, representative window panel units that include a molded article disposed on or along the peripheral edge of a window panel are also described herein.

In one embodiment of the present invention, molded articles are preferably received or disposed within a space defined between a window frame of a vehicle body panel and a peripheral edge of a window panel disposed therein. The molded article includes a molding body. The molding body may include a head portion, a leg portion extending from the head portion, and an engagement portion extending from the leg portion. The head portion and the leg portion are preferably arranged and constructed to contact and engage a peripheral edge of the window panel.

The head portion preferably includes a first portion that is arranged and constructed to contact an edge surface of the window panel. Further, the head portion is preferably designed so that the head portion will be flush, or substantially flush, with an outer surface of the window panel. The head portion also preferably includes a second portion that is arranged and constructed to face or oppose a side wall of the window fame. An ornamental surface optionally may extend from the first portion to the second portion.

The molded article also includes an elastic lip that continuously extends from a lower or terminal end of the leg portion toward the side wall of the window frame. The elastic lip is preferably arranged and constructed to elastically contact the side wall of the window frame. The elastic lip is preferably made from a resinous material that is softer or more elastic than the molding body.

The molded article may further include a connecting strip that continuously extends from the elastic lip to the second portion of the head portion. Preferably, the ornamental surface of the head portion may be substantially continuous and flush with the outer surface of the window panel when the molded article is received within the space defined between the peripheral edge of the window panel and the window frame of the vehicle. In order to install the molded article and the window panel in the window frame of the vehicle, the molded article may first be attached to the periphery of the window panel, thereby providing a molding panel unit that includes the window panel and the molded article. Then, the molding panel unit may be disposed within the window frame of the vehicle.

A substantially hollow portion may be defined by inner surfaces of the head portion, the leg portion, the elastic lip and the connecting strip, which elements are continuously connected to each other.

In anther embodiment of the present invention, the ornamental surface of the head portion may have a convex shape. For example, a first curved surface may be defined adjacent to the first portion and a second curved surface may be defined adjacent to the second portion. The second curved surface may have a radius of curvature smaller than the first curved surface. Optionally, an ornamental film may be disposed on the ornamental surface and the ornamental film may have a special color that is different from the head portion. The ornamental film may preferably comprise a metallic glossy tape.

In another embodiment of the present invention, the engagement portion may extend from the leg portion and may include a retainer surface that is substantially parallel to an inner surface of the window panel. Optionally, an adhesive layer may be applied or interposed between the edge surface of the window panel and the leg portion and/or between an inner surface of the window panel and the retainer surface of the engagement portion.

In an additional representative example of the present invention, the engagement portion may extend from a lower or terminal end of the leg portion in a folded fashion. After installation of the window panel, the engagement portion may engage the periphery of the window panel when it is inserted into the space together with the leg portion.

Additional representative examples of the present invention will be described in further detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the above detail description may not be necessary to practice the invention in the broadest sense, and are instead taught merely to particularly describe some representative examples of the invention. In addition, the present invention naturally may be combined in ways that are not specifically enumerated in order to provide additional useful embodiments of the invention.

Two detailed representative embodiments of the present invention are shown in FIGS. 1 to 8, in which a rear window pane and an elongated rear window molding for a vehicle are desired as representative examples of a window panel and a molded article, respectively. Therefore, in these embodiments, a rear window pane unit that comprises the rear window pane and the rear window molding is described as a representative panel unit according to the present invention.

FIRST DETAILED REPRESENTATIVE EMBODIMENT

The first detailed representative embodiment will now described with reference to FIGS. 1 to 6. As shown in FIG. 1, the vehicle include a body panel 1 that comprises a roof panel 1a, rear quarter panels 1b and other such panels. An annular shouldered window frame 2 may be defined around a rear window opening 5 (FIGS. 2–4) formed within the body panel 1. As will be appreciated, the rear window pane 7 may preferably be received within the window frame 2.

Figure 2:
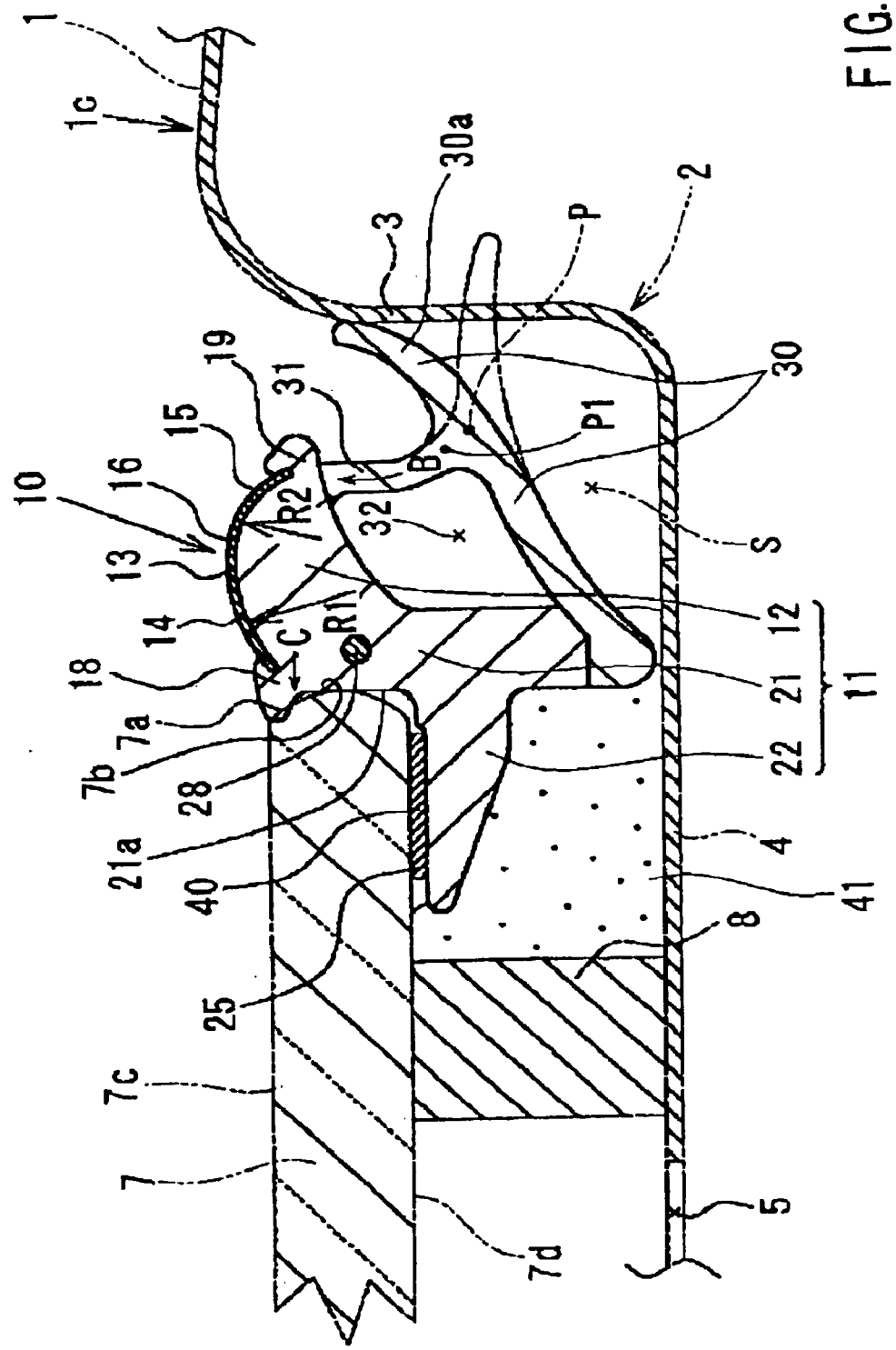
FIG. 2 is a cross-sectional view taken along line II—II shown in FIG. 1.
Figure 3:
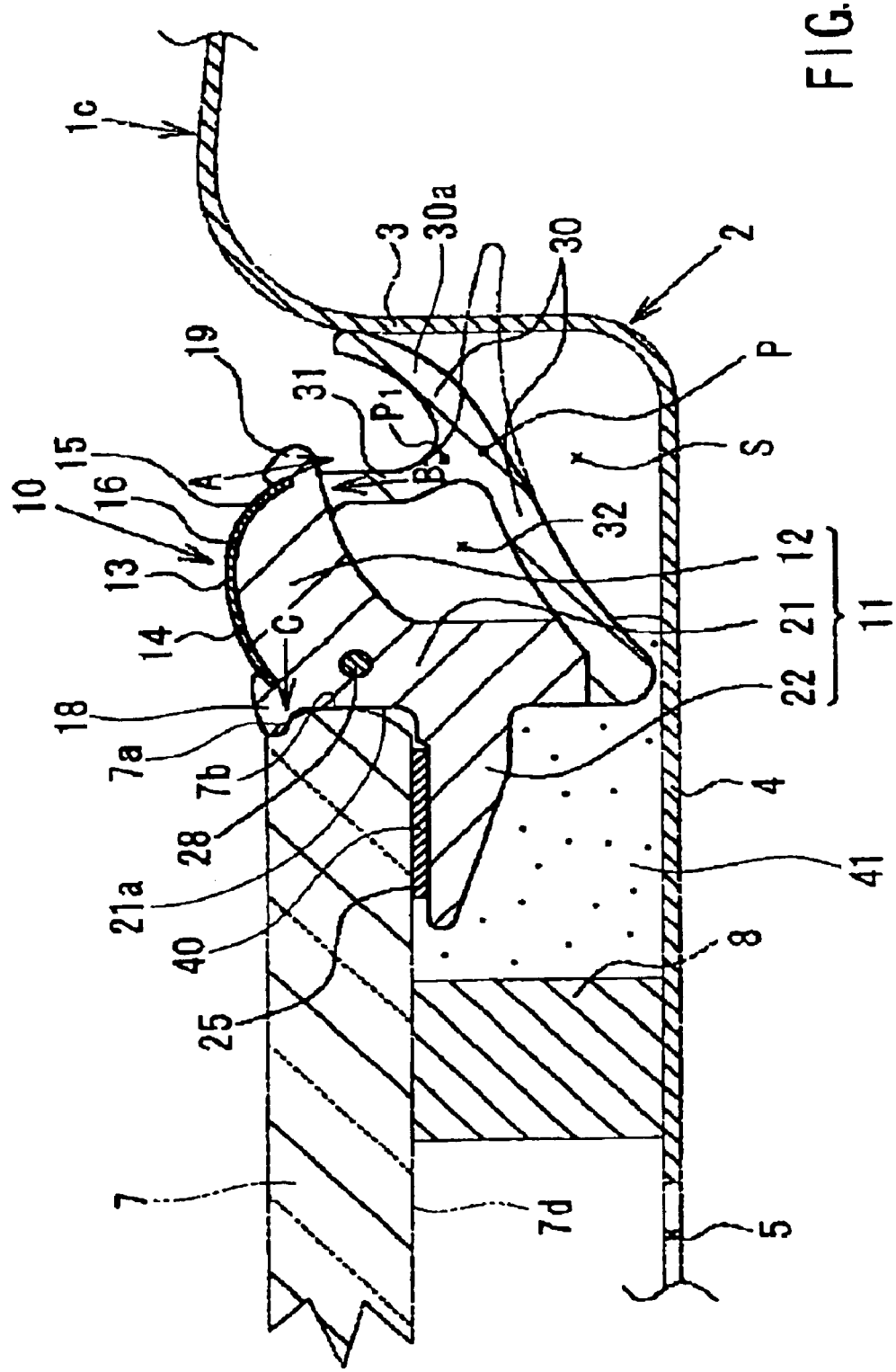
FIG. 3 is a cross-sectional view taken along line III—III shown in FIG. 1, showing a corner portion.
Figure 4:
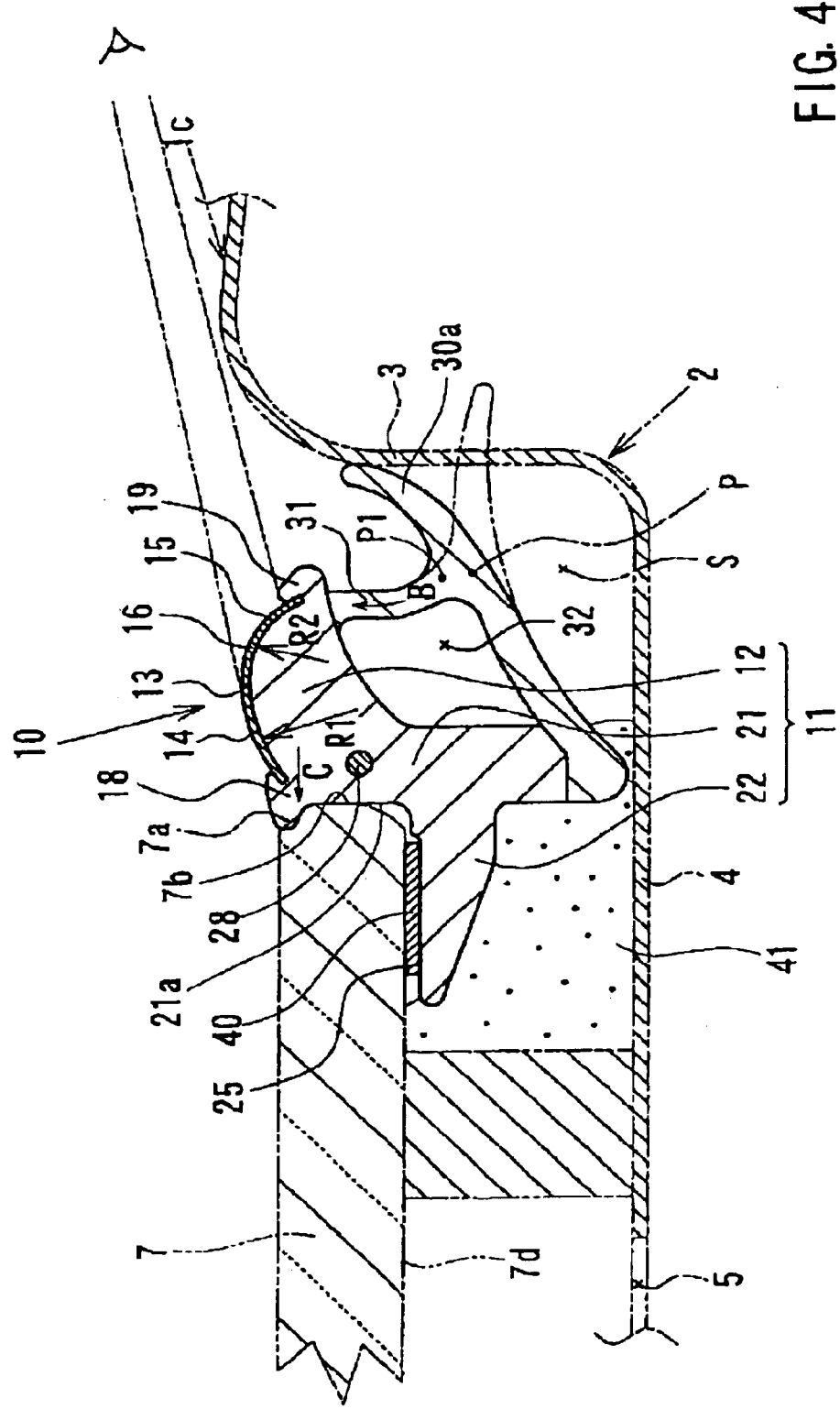
FIG. 4 is a cross-sectional view taken along line IV—IV shown in FIG. 1.

As best shown in FIGS. 2–4, the window frame 2 of the body panel 1 may preferably be formed by pressing the body panel 1 toward the cabin of the vehicle. The window frame 2 may include a vertical side wall 3 and a flange-like bottom wall 4. The side wall 3 and the bottom wall 4 preferably define the rear window opening 5.

The rear window pane 7 preferably may include an elastic rubber dam 8 that is fixedly adhered to the inner surface 7d of the window pane 7. For example, an adhesive material (not shown) may first be applied along a peripheral portion of an inner surface 7d of the rear window pane 7. Then, the rear window pane 7 may be disposed within the window frame 2 and may be pressed or forced toward the bottom wall 4. Thus, the rear window pane 7 may be preferably affixed to the window frame 2 with the rubber dam 8 interleaved between the rear window pane 7 and the window frame 2. Further, a portion of the edge surface 7b of the rear window pane 7 may be chamfered so as to define a chamfered portion in 7a within the edge surface 7b.

As shown in FIGS. 1–4, the rear window molding 10 is preferably designed to be received within a space S defined between the periphery of the rear window pane 7 and the side wall 3 of the window frame 2. In this representative embodiment, the rear window molding 10 includes an elongated molding body 11 that is preferably made from a hard or semi-hard synthetic resin having a hardness between about HDA 80 and HDA 100 (a durometer hardness based upon Japanese Industrial Standard K7215). For example, the elongated molding body 11 may be made, e.g., from PVC (polyvinyl chloride) resins, ABS (acryloniterile butadiene styrene) resins, PP (polypropylene) resins and/or TPE (thermoplastic elastomers).

The rear window molding 10 further includes an elongated elastic lip 30 and an elongated connecting strip 31 that are integrated and continuous with the molding body 11. The elastic lip 30 and the connecting strip 31 are preferably made from an elastic material having a hardness between about HDA 50 and HDA 80 (a durometer hardness based upon JIS K 7215) and may be made, e.g., from soft synthetic reins, rubbers and/or TPE. That is, the elastic lip 30 and the connecting strip 31 are preferably made from an elastic material having a lesser hardness and a higher or greater elasticity than the molding body 11.

Figure 6:
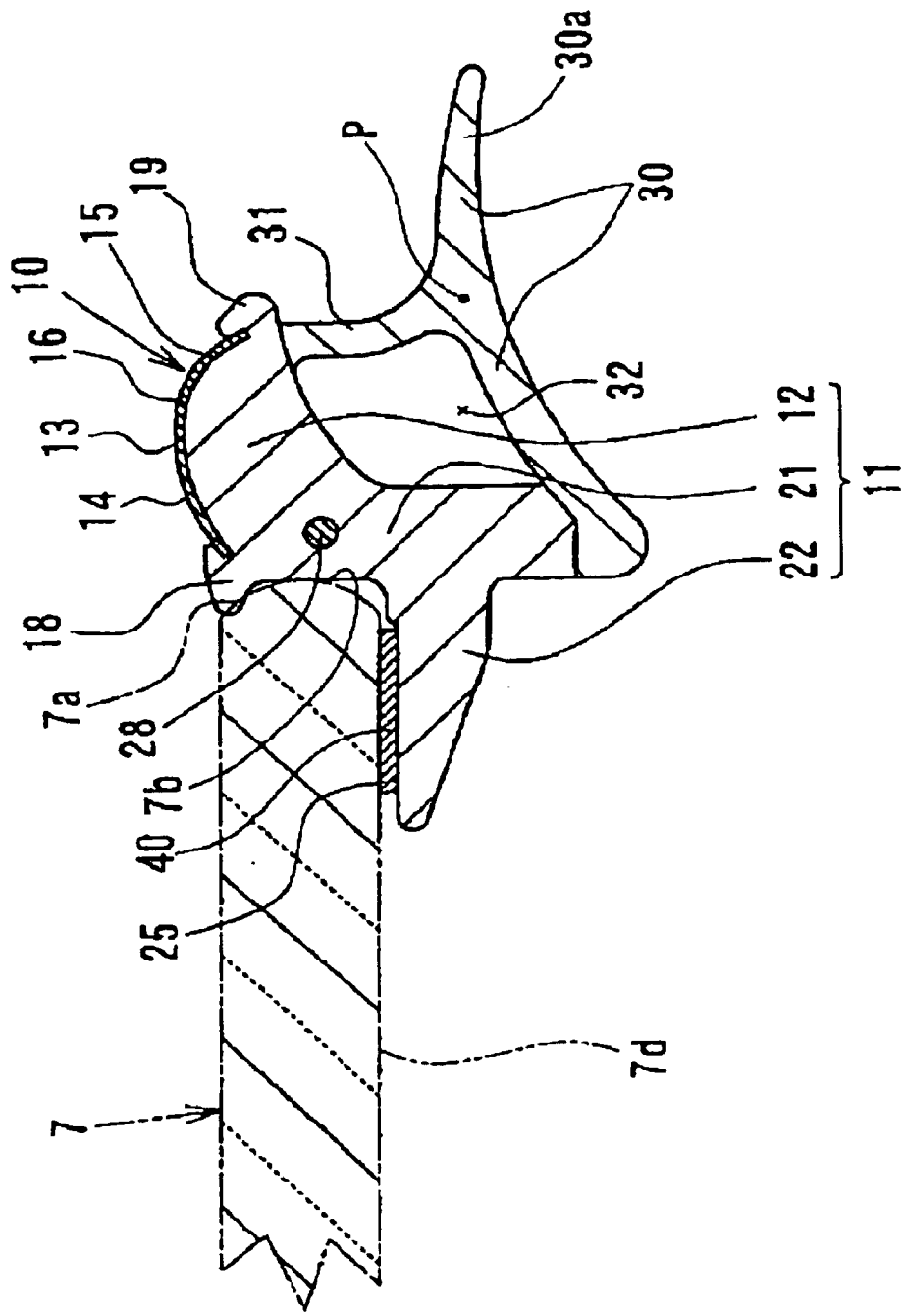
FIG. 6 is a cross-sectional view taken along line VI—VI shown in FIG. 5.

Point P shows the connecting point of the elastic lip 30 and the connecting strip 31 in a free state of the rear window molding 10. Further, the free state of the rear window molding 10 means a state in which the rear window molding 10 is not received within the space S, as shown in FIG. 6.

The rear window molding 10 may be integrally manufactured by extrusion molding, and more preferably, by co-extrusion molding. The rear window molding 10 may preferably have a length that substantially corresponds to the circumferential length (i.e., the perimeter) of the rear window pane 7. Further, the material of the elastic lip 30 and the connecting strip 31 is compatible with the material of the molding body 11. Therefore, when the molding body 11 is made, e.g., from PVC resins, the elastic lip 30 and the connecting strip 31 may be integrally made from chlorinated ethylene copolymers, preferably by the co-extrusion molding.

As shown in FIGS. 2–4, the molding body 11 of the elongated rear window molding 10 includes a head portion 12, a leg portion 21 and an engagement portion 22, which portions are integrally and continuously formed. The head portion 12 may include a first portion 18, a second portion 19 and an ornamental surface 13 that extends from the first portion 18 to the second portion 19. The first portion 18 may preferably be designed to contact the chamfered portion 7a of the rear window pane 7, when the rear window molding 10 is disposed within the space S, so that the upper surface of the first portion 18 will be flush, or substantially flush, with the outer surface 7c of the rear window pane 7. The second portion 19 is designed to face (or project towards) the side wall 3 of the window frame 2 when the rear window molding 10 is disposed within the space S.

The ornamental surface 13 optionally may be convexly curved outwardly (i.e., curved away from the vehicle). In addition, the ornamental surface 13 may include a first curved surface 14 having a radius of curvature R1, and a second curved surface 15 having a radius of curvature R2, which is smaller than the radius of curvature R1. For example, the ornamental surface 13 may be formed as a border-less surface in which the second curved surface 15 smoothly continues or extends from the first curved surface 14.

An ornamental tape or film 16 optionally may be disposed over and along the entire length of the head portion 12. In this case, the film 16 will be disposed over at least a portion of the ornamental surface 13 in a crosswise direction (e.g., a crosswise central portion of the ornamental surface 13) and will cover the entire length of the ornamental surface 13. In this respective embodiment, the ornamental film 16 preferably has a color that is different from the head portion 12. More preferably, the ornamental film 16 may have a metallic glossy appearance, although a variety of decorative styles may be utilized for the ornamental film 16.

If the ornamental film 16 has a metallic glossy appearance, the ornamental film 16 may preferably be a laminate film, which includes a substrate layer made from a synthetic resin that is compatible with the molding body 11. A glossy metallic layer may be formed or disposed on the substrate layer, e.g., by vacuum metalization (e.g., vacuum evaporation or sputtering). A cover layer may be formed from a transparent synthetic resin and optionally may be utilized to protect the metallic layer. For example, the ornamental film 16 may be simultaneously fed onto and adhered to the ornamental surface 13 of the head portion 12 when the molding body 11 is extrusion molded. The ornamental film 16 may be embedded within the periphery of the head portion 12 in order to reliably secure the ornamental film 16 to the ornamental surface 13. However, the ornamental film 16 optionally can be simply made from a stainless steel foil or an aluminum foil, if necessary.

The leg portion 21 continuously projects or extends from the inner side of the head portion 12. The leg portion 21 is preferably designed so as to extend along the edge surface 7b of the rear window pane 7 when the rear window molding 10 is disposed within the space S. Further, a core 28 (e.g., a metal wire or a metal band) optionally may be embedded within the leg portion 21. In this case, the core 28 will reinforce the rear window molding 10 and prevent thermal expansion and shrinkage of the rear window molding 10.

The engagement portion 22 continuously projects or extends from the leg portion 21. The engagement portion 22 is preferably designed so as to extend along the inner surface 7d of the rear window pane 7 when the rear window molding 10 is disposed within the space S. That is, the engagement portion 22 preferably extends in the opposite direction from the head portion 12. The engagement portion 22 may include an upper retainer surface 25 that is designed to be substantially parallel to the rear window pane inner surface 7d when the rear window molding 10 is received within the space S.

Further, as will be recognized, the engagement portion 22 may be appropriately positioned such that the distance between the retainer surface 25 and the first portion 18 of the head portion 12 is substantially identical to the thickness of the rear window pane 7.

Optionally, an adhesive layer 40 (e.g., a double-faced pressure-sensitive adhesive tape) may be disposed on the retainer surface 25 of the engagement portion 22 in order to adhere the molding body 11 to the inner surface 7d of the rear window pane 7. As will be appreciated, the adhesive layer 40 can be provided on only the rear window pane inner surface 7d or on both the retainer surface 25 and the rear window pane inner surface 7d.

Instead of or in addition to the adhesive layer 40, another adhesive layer (not shown, which is similar to the adhesive layer 40, can be interleaved between the rear window pane edge surface 7b and a corresponding surface 21a of the leg portion 21. In this case, the leg portion 21 can be adhered to the rear window pane edge surface 7b, to thereby prevent formation of an undesirable clearance between the first portion 18 of the head portion 12 and the rear window pane 7.

As shown in FIGS. 2–4, the elastic lip 30 is integrated (continuous) with and projects (extends) from a lower or terminal end of the leg portion 21. The elastic lip 30 preferably extends in the same direction, or substantially the same direction, as the head portion 12 (i.e., toward the side wall 3 of the window frame 2). The elastic lip 30 preferably has sufficient length, so as to elastically contact the window frame side wall 3 and generate an elastic engagement therebetween when the rear window molding 10 is received within the space S. In the free state as shown in FIG. 6 (which state is shown by a broken line in FIGS. 2–4), the elastic lip 30 preferably may convexly curve toward the head portion 12. The distal end portion 30a of the elastic lip 30 may outwardly bend or flex, to thereby elastically contact the window frame side wall 3 when the rear window molding 10 is received within the space S.

The connecting step 31 is integrated (continuous) with a substantially medial portion of the elastic lip 30. The connecting strip 31 continuously extends from the elastic lip 30 to the head portion 12. For example, the connecting strip 31 preferably connects or is integrated with the head portion 12 in the vicinity of the second portion 19. In this case, a hollow cavity 32 is defined by the head portion 12, the leg portion 21, the elastic lip 30 and the connecting strip 31. The hollow cavity 32 enables the connecting strip 31 to freely change its shape and/or position, which will be described below in further detail.

Figure 5:
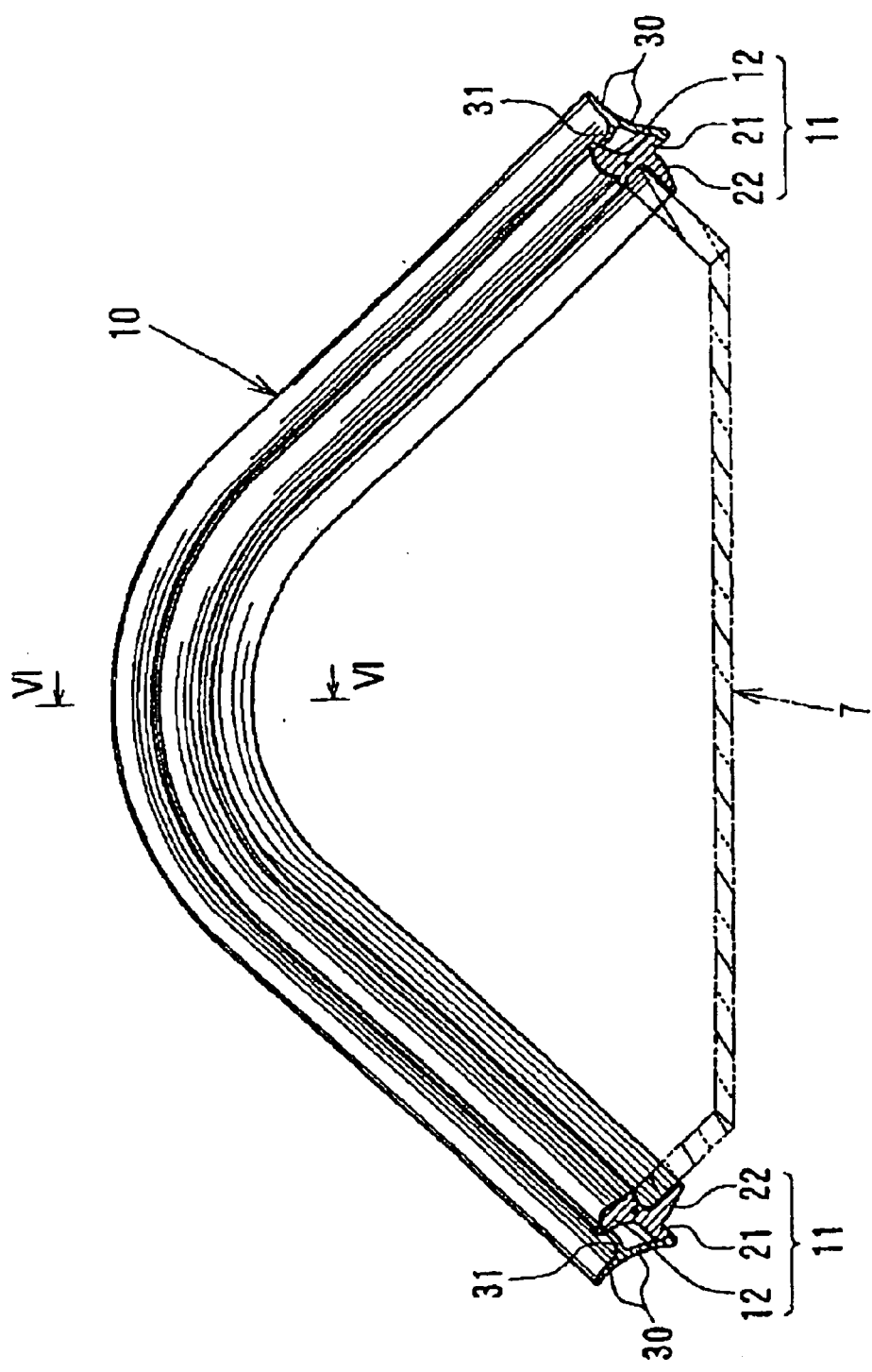
FIG. 5 is a partially perspective view of a rear window-pane unit that comprises a rear window molding attached to a rear windowpane.

The rear window molding 10 thus constructed is attached to the rear window pane 7, in order to form the rear window pane unit that is constructed and includes the rear window molding 10 and the rear window pane 7, as shown in FIGS. 5 and 6. That is, the adhesive layer 40 may be applied to the retainer surface 25 of the engagement portion 22 of the rear window molding 10. Then, the retainer surface 25 is bonded or adhered to the rear surface 7d of the rear window pane 7 while the first portion 18 of the head portion 12 and the leg portion 21 contact the edge surface 7b of the rear window pane 7. As a result, the rear window molding 10 will be fixedly attached to the periphery of the rear window pane 7, to thereby form the rear window pane unit. As will be recognized, the rear window molding 10 bends along the corners of the rear window pane 7 (FIG. 5).

Thus, the rear window molding 10 can be easily and accurately attached to the rear window pane 7 by utilizing the adhesive layer 40. When the rear window molding 10 is thus attached to the periphery of the rear window pane 7, the retainer surface 25 can be securely adhered to the rear window pane inner surface 7d, because the retainer surface 25 of the engagement portion 22 is substantially parallel to the rear window pane inner surface 7d. As a result, the rear window molding 10 can be stabilized on and reliably attached to the rear window pane 7. Therefore, the rear window molding 10 preferably will be prevented from moving on or partially separating from the rear window pane 7 during use.

The rear window pane unit thus assembled may be disposed within the window frame 2 of the body panel 1 at a vehicle assembly line (not shown) and then the rear window pane 7 may be secured thereto. For example, a paste like sealing adhesive 41 is dispensed around or along the periphery of the inner surface 7d of the rear window pane 7. Thereafter, the rear window pane unit may be disposed within the window frame 2 and then the rear window pane 7 is forced or pressed toward the bottom wall 4. Thus, the rear window pane 7 is secured to the window frame 2 by the adhesive force of the sealing adhesive 41 with the rubber dam 8 interleaved therebetween. At the same time, the rear window molding 10 that is attached to the rear window pane 7 is disposed within the space S.

Thus, because the rear window molding 10 and the rear window pane 7 are first assembled as the rear window pane unit, the rear window molding 10 can be easily disposed within the space S in the vehicle assembly line. In other words, the rear window molding 10 can be disposed within the space S at the same time that the rear window pane 7 is attached to the window frame 2. By pre-assembling the rear window pane 7 with the rear window molding 10, construction of relatively large vehicles can be simplified. For example, in some cases, a relatively large rear window pane 7 may be beyond the reach of the person working on the vehicle assembly line. As a result, it ordinarily may be difficult to dispose the rear window molding 10 with the space S after the large rear window pane 7 has been independently attached to the window frame 2 on the vehicle assembly line. Also, the pre-assembly is more useful if the adhesive layer 40 must be used at a desired temperature range in order to provide good adhesive performance, because the rear window pane 7 can be previously heated to such a temperature range before the rear window molding 10 is attached.

Although the assembly of the rear window pane unit that comprises the rear window molding 10 and the rear window pane 7 can be performed at the vehicle assembly line, such assembly can be performed in a manufacturing factory of the rear window molding 10 or a manufacturing factory of the rear window pane 7. The rear window pane unit thus assembled can be easily handled, shipped and stored. Because it is not necessary to dispose the rear window molding 10 in the space S at the vehicle assembly line, work productivity can be improved. Such effect can be increased for relatively large vehicles.

As shown in FIGS. 2–4, when the rear window pane 7 is secured to the window frame 2, the rear window molding 10 is disposed within the space S, so that the ornamental surface 13 of the head portion 12 is substantially flush with the outer surface 7c of the rear window pane 7 and an outer surface 1c of the body panel 1.

At this time, the distal end portion 30a of the elastic lip 30 elastically contacts the side wall 3 of the window frame 2, to thereby form the elastic engagement therebetween. As a result, the elastic lip 30 is elastically deformed, so that the connecting point P of the elastic lip 30 and the connecting strip 31 may preferably shift to point P1. This shift of the connecting point P caused by the elastic deformation of the elastic lip 30 may effectively produce a force shown by arrow B, to thereby upwardly or outwardly force the connecting strip 31. When the connecting strip 31 is upwardly forced in this direction, the head portion 12 is upwardly forced in the vicinity of the second portion 19 of the head portion 12, to thereby produce a force shown by arrow C in the head portion 12. This force shown by the arrow C may press the molding body 11 against or towards the peripheral edge of the rear window pane 7. As a result, the first portion 18 of the head portion 12 and the surface 21a of the leg portion 21 may closely contact the chamfered portion 7a and the edge surface 7b of the rear window pane 7, respectively. Thus, the rear window molding 10 can be reliably secured in the space S without producing gaps between the head portion 12 and the rear window pane 7. Further, because the connecting strip 31 is preferably separated or displaced from the leg portion 21 by the hollow cavity 32, the connecting strip 31 can be freely deformed.

As shown in FIG. 3, the inner side of the head portion 12 may be compressed around the core 28 at a corner portion of the window frame 2 (which portion corresponds to the corner portion of the rear window pane 7). As a result, the length of the inner side of the head portion 12 will be reduced and compressive stresses will be generated therein. At the same time, the outer side of the head portion 12 may be pulled around the core 28. As a result, the length of the outer side of the head portion 12 will be increased and tensile stresses will be generated therein. When these stresses are produced in the head portion 12, corresponding restoring forces for restoring the original length of the head portion 12 and for relieving such stresses may be produce in the head portion 12. As a result, a force is applied to the second portion 19 of the head portion 12, as shown by arrow A, which force may act to bend or deform the second portion 19 inwardly (i.e., toward the interior (cabin) of the vehicle).

However, the force shown by arrow A is offset or cancelled by the force shown by arrow B (i.e., which outwardly forces or urges the connecting strip 31). Therefore, the second portion 19 of the head portion 12 can be effectively forced or biased back by the connecting strip 31 and prevented from inwardly bending or deforming. Thus, the head portion 12 that is disposed within the corner portion of the window frame 2 may have substantially the same configuration as the head portion 12 corresponding to a straight portion of the window frame 2. In other words, the entire length of the head portion 12 may have a uniform configuration or shape, even though the molding 10 is bent around the corners of the window frame 2. In addition, at the corner portion of the window frame 2, the head portion 12 of the rear window molding 10 can reliably contact the rear window pane 7 without producing gaps therebetween.

Such a uniform configuration over the entire length of the head portion 12 imparts an attractive appearance of the rear window molding 10. Further, the rear window molding 10 can be modified such that the second portion 19 of the head portion 12 extends over the side wall 3 of the window frame 2 or the outer surface 1c of the body panel 1 in order to cover the space S. Such an extended second portion (not shown) may be more significantly affected than the normal second portion 19 when the force is applied as shown by arrow A. Therefore, the present molding construction is more effective for a rear window molding thus modified.

As described above, the ornamental surface 13 of the head portion 12 may preferably convexly curve toward the exterior of the vehicle. In addition, the ornamental surface 13 may include the first curved surface 14 having the radius of curvature R1, and the second curved surface 15 having the radius of curvature R2. The radius of curvature R2 is preferably less or smaller then the radius of curvature R1. As shown in FIG. 4, when the ornamental film 16 that covers the ornamental surface 13 is viewed from an exterior side position of the vehicle, the second curved surface 15 having the smaller radius of curvature R2 can be seen over its desired width thereof. Therefore, such a two-part form of ornamental surface 13 imparts an attractive appearance of the rear window molding 10.

Further, as described above, the metallic glossy ornamental film 16 is provided on the head portion 12 and the metallic glossy ornamental film 16 covers the entire length of the ornamental surface 13. Such a metallic glossy ornamental film 16 may provide an increased visibility to the ornamental surface 13, to thereby further improve the appearance of the rear window molding 10.

Second Detailed Representative Embodiment

The second detailed representative embodiment will now described with reference to FIGS. 7 and 8. Because the second embodiment relates to the first embodiment, only constructions and elements that are different from the first embodiment will be explained in detail. Elements that are the same in the first and second embodiments will be identified by the same reference numerals and detailed description of such elements will be omitted.

Unlike the first embodiment, the rear window molding 10' of this embodiment is intended to be separately received within the space S after the rear window pane 7 has been attached to the window frame 2 of the body panel 1. In other words, this rear window molding 10' is not intended to be first attached to the periphery of the rear window pane 7 before the rear window pane 7 is attached to the body panel 1.

The rear window molding 10' may preferably include an engagement portion 22A, instead of the engagement portion 22 in the first embodiment. The engagement portion 22A extends upwardly at an angle from the lower or terminal end of the leg portion 21 in a folded shape. The engagement portion 22A includes an upper retainer surface 25A that is arranged and constructed to contact the inner surface 7d of the rear window pane 7. Further, the engagement portion 22A may preferably be arranged such that the distance between the retainer surface 25A and the first portion 18 of the head portion 12 is substantially identical to the thickness of the rear window pane 7.

Figure 7:
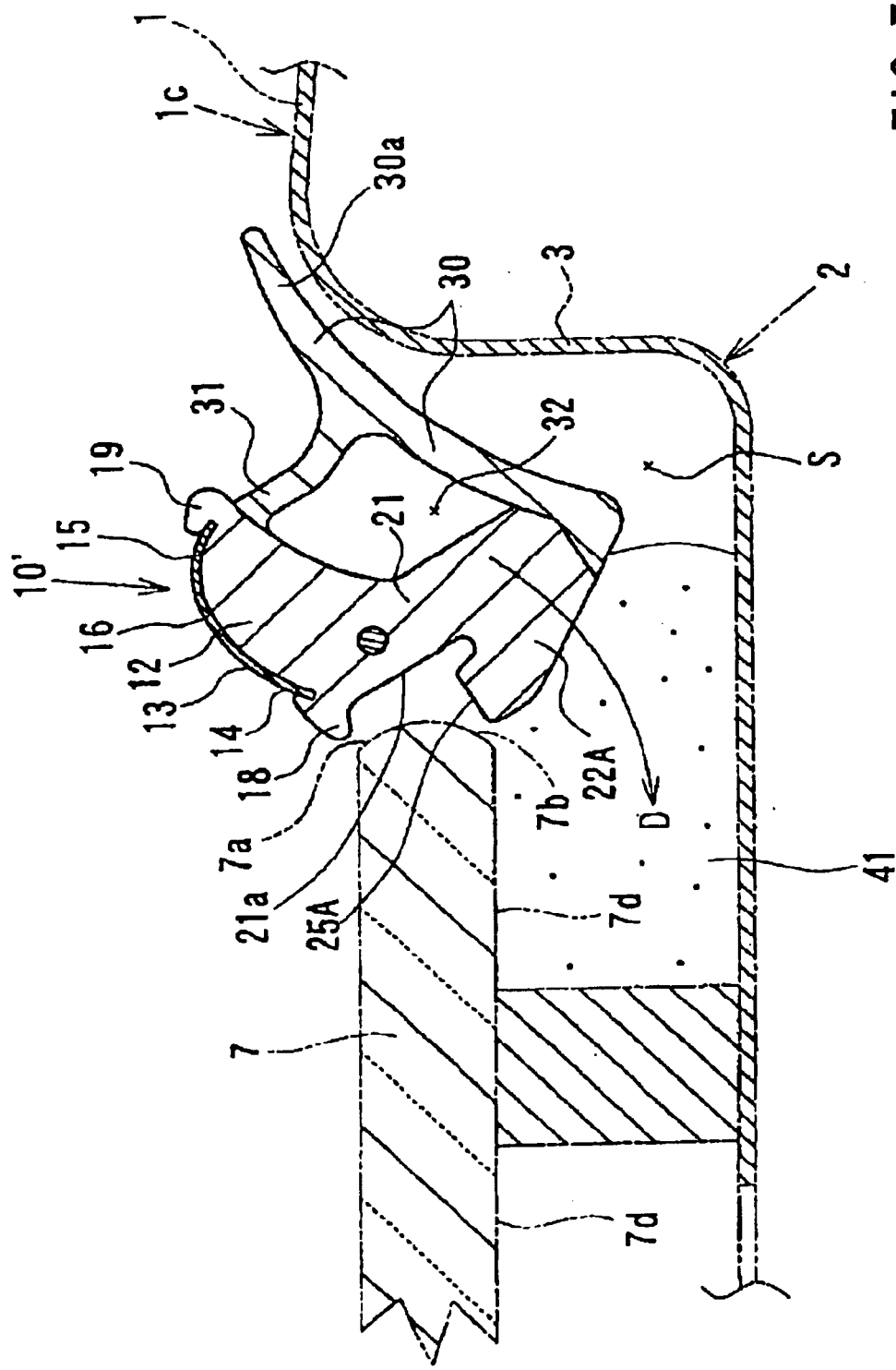
FIG. 7 is a cross-sectional view of a rear window molding according to a second embodiment of the present invention before it is attached to the window frame of the body panel.
Figure 8:
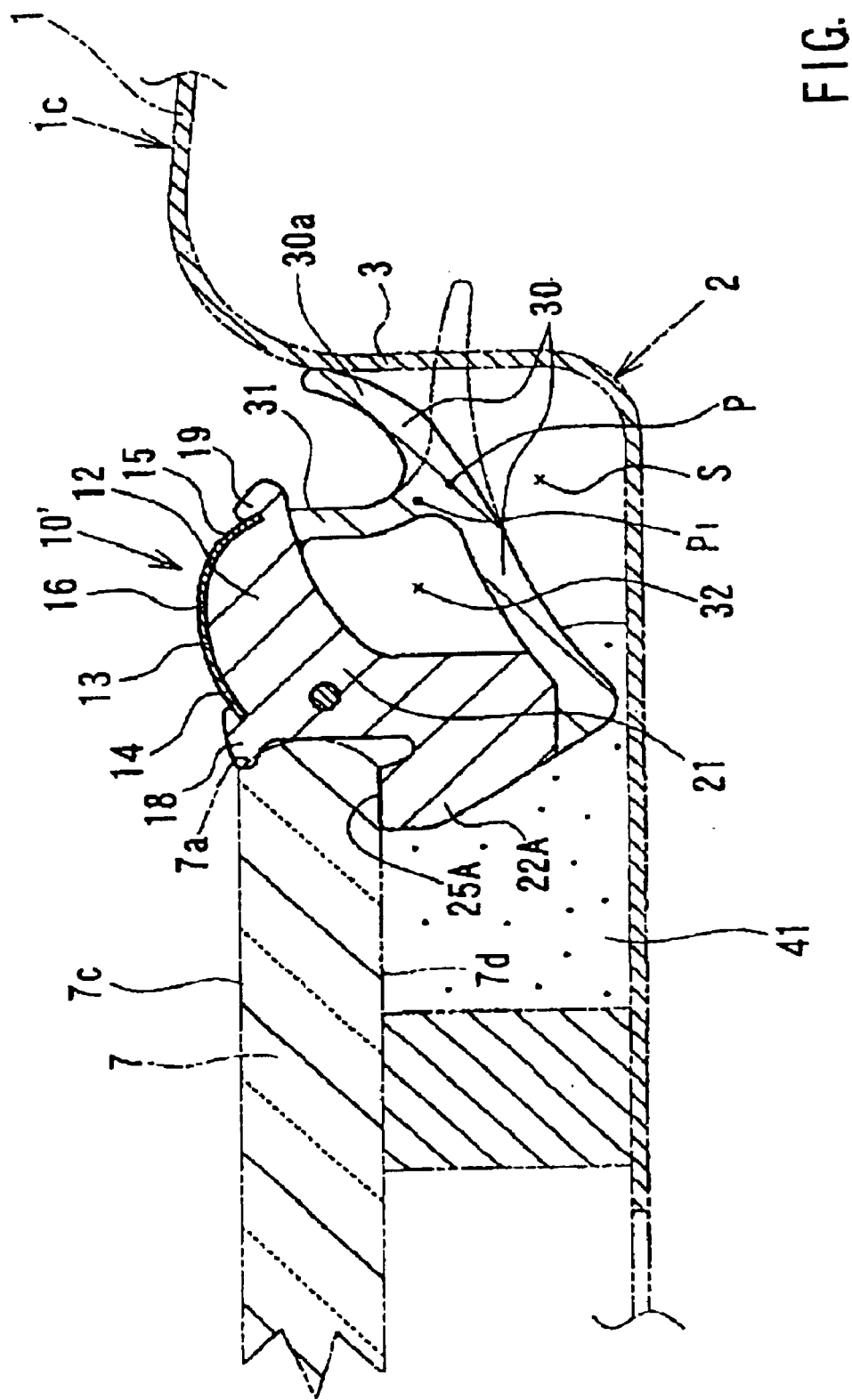
FIG. 8 is a cross-sectional view of the rear window molding after it has been attached to the window frame of the body panel.
Figure 9:
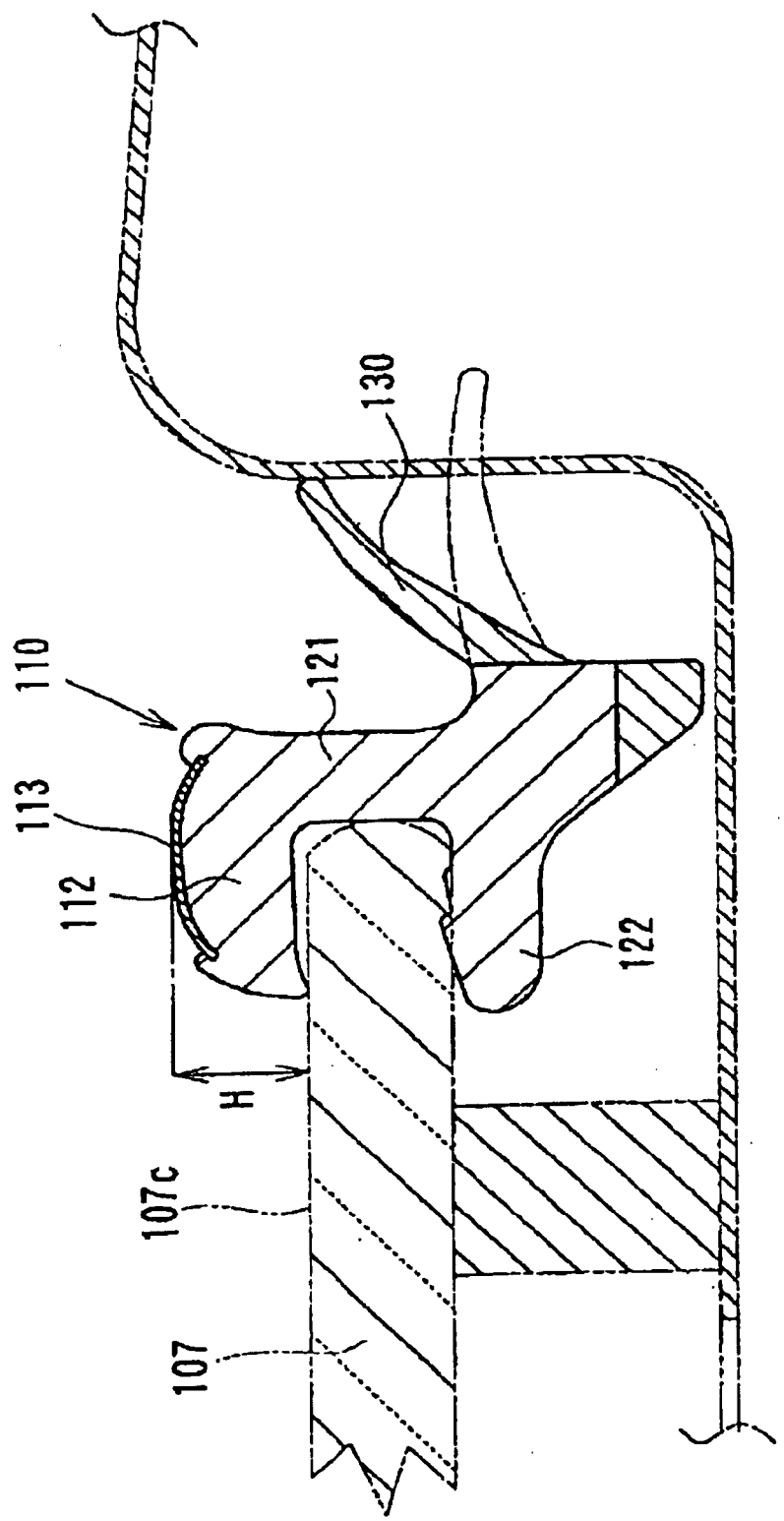
FIG. 9 is a cross-sectional view of a known window molding that is attached to the body panel.
Figure 10:
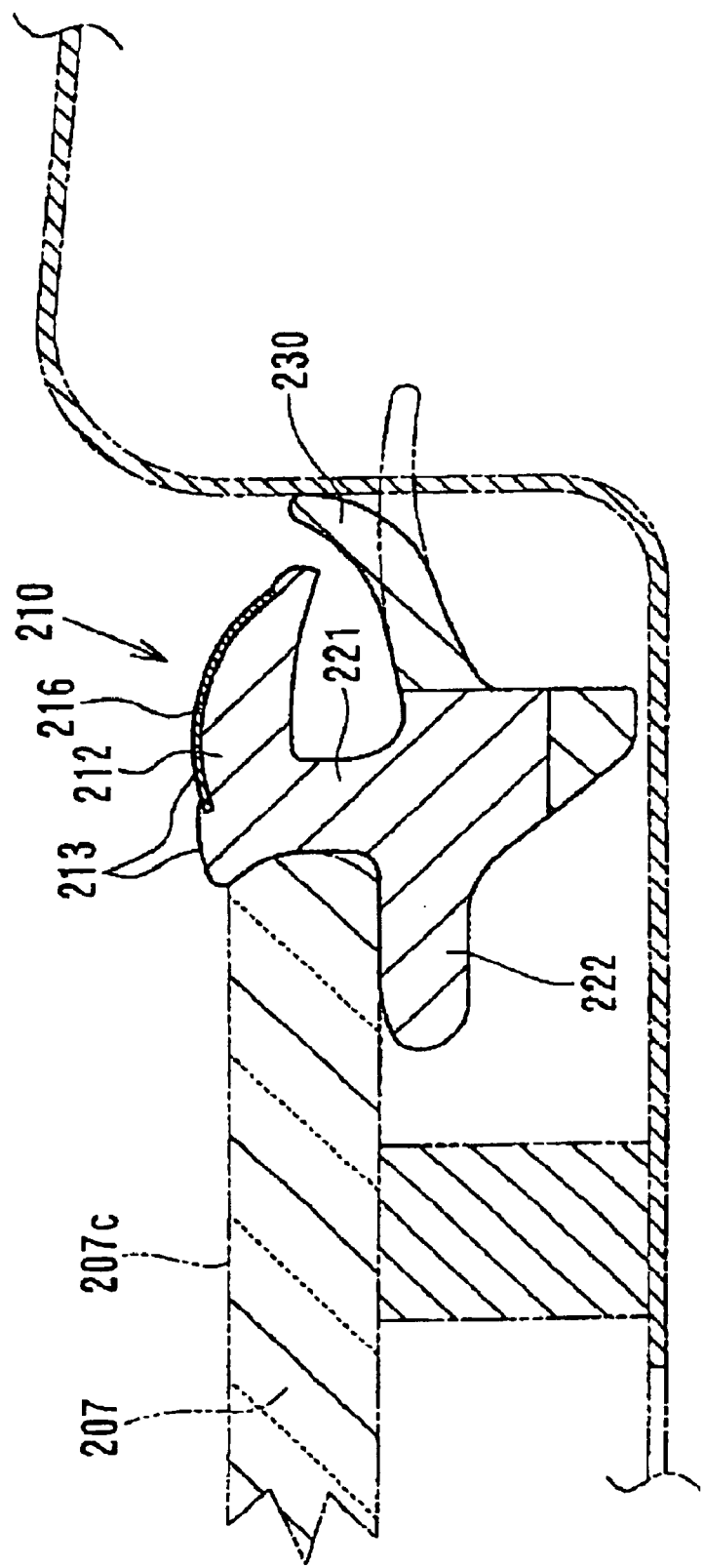
FIG. 10 is a cross-sectional view of window molding that was previously invented by the present inventor, illustrating a condition in which it is attached to the body panel.

When the rear window molding 10' thus constructed is attached to the body panel 1, as shown in FIG. 7, the rear window pane 7 is first disposed and received within the window frame 1 of the body panel 1 and is secured thereto by the sealing adhesive 41. Thereafter, the rear window molding 10' may be inserted into the space S. For example, the rear window molding 10' may be obliquely positioned within the space S such that the distal end portion 30a of the elastic lip 30 projects over the outer surface 1c of the body panel 1. Thereafter, the first portion 18 of the head portion 12 is pressed against the chamfered portion 7a of the rear window pane 7. The rear window molding 10' is then pivotally rotated around the first portion 18 in the direction shown by arrow D (clockwise) until the surface 21a of the leg portion 21 contacts the edge surface 7b of the rear window pane 7. As shown in FIG. 8, the upper retainer surface 25A of the engagement portion 22A will therefore contact the inner surface 7d of the rear window pane 7. At the same time, the distal end portion 30a of the elastic lip 30 will elastically contact the side wall 3 of the window frame 2, to thereby define an elastic engagement therebetween. Thus, the rear window molding 10' may be secured within the space S in this manner.

According to the present invention, the rear window moldings 10, 10' can be designed such that the ornamental surface 13 of the head portion 12 is substantially flush with the outer surface 7c of the rear window pane 7. Also, the window moldings 10, 10' thus constructed can be reliably secured within the space S with the aid of the connecting strip 31. As a result, the window moldings 10,10' can be effectively prevented from slipping or falling out of the space S during use. In addition, because the corner portions of the head portion 12 can be effectively prevented from bending or deforming, the entire length of the window moldings 10, 10' will have an attractive appearance.

Various changes and modifications may be made to the representative embodiments without departing from the scope of the present invention. That is, the construction of the rear window moldings 10, 10' is not limited to the representative embodiments. For example, the ornamental film 16 may be modified or omitted, if desired. Further, the window panel and the molded article may be, respectively, a front window pane and a front window molding of the vehicle.

What is claimed is:

1. A molded article arranged and constructed to be received within a space between a window frame of a vehicle body panel and a window panel having a chamfered portion formed within its edge surface, the window frame having a side wall and a bottom wall, comprising:

a molding body having a head portion, a leg portion extending from the head portion and an engagement portion,
wherein the head portion, the leg portion and the engagement portion are arranged and constructed to partially contact the window panel when the molded article is received within the space,
wherein the head portion comprises a first portion arranged and constructed to correspond to the chamfered portion of the window panel when the molded article is received within the space so that an outer surface of the head portion is substantially flush with an outer surface of the window panel,
wherein the head portion comprises a second portion arranged and constructed to project towards the side wall when the molded article is received within the space so as to be retained in the space without contacting the side wall,
wherein the leg portion is arranged and constructed to extend from an inner side of the head portion toward the bottom wall along the edge surface of the window panel when the molded article is received within the space, and
wherein the engagement portion is arranged and constructed to extend from the leg portion in a direction opposite to the second portion of the head portion along an inner surface of the window panel when the molded article is received within the space, an elastic lip continuously extending from the molding body and arranged and constructed to partially elastically contact the window frame and to elastically deform when the molded article is received within the space, and a connecting strip continuously extending from the elastic lip, the connecting strip being integral and continuous with the head portion, wherein the connecting strip is arranged and constructed to upwardly the head force to a portion when the elastic lip is elastically deformed, so that the first portion is pressed against the chamfered portion of the window panel.

2. A molded article as defined in claim 1, wherein the molding body is made from a first resinous material and the elastic lip and the connecting strip are made from a second resinous material, the first resinous material being different from the second resinous material.

3. A molded article as defined in claim 2, wherein the first resinous material has a greater hardness than the second resinous material.

4. A molded article as defined in claim 1, wherein the head portion includes a convexly curved ornamental surface that comprises a first curved surface and a second curved surface, the second curved surface having a radius of a curvature smaller than the first curved surface.

5. A molded article as defined in claim 4, further comprising an ornamental film disposed on the ornamental surface, wherein the ornamental film comprises a metallic glossy film.

6. A molded article as defined in claim 1, wherein the engagement portion extends from the leg portion and includes a retainer surface that is arranged and constructed to be substantially parallel to the inner surface of the window panel.

7. A molded article as defined in claim 6, wherein an adhesive layer is interleaved between at least one of (1) a peripheral edge surface of the window panel and the leg portion and (2) the inner surface of the window panel and the retainer surface of the engagement portion.

8. A molded article as defined in claim 1, wherein the engagement portion continuously extends from a terminal end of the leg portion in a bent-over shape and includes a retainer surface that is arranged and constructed to engage the peripheral edge of the window panel.

9. A window panel unit comprising a window panel and a molded article that is attached to a peripheral edge of the window panel, the molded article being arranged and constructed to be received within a space defined between a window frame of a vehicle body panel and the window panel having a chamfered portion formed within its edge surface, the window frame having a side wall and a bottom wall, the molded article comprising:

a molding body having a head portion, a leg portion extending from the head portion and an engagement portion,
wherein the head portion, the leg portion and the engagement portion are arranged and constructed to partially contact the window panel when the molded article is received within the space,
wherein the head portion comprises a first portion arranged and constructed to correspond to the chamfered portion of the window panel when the molded article is received within the space so that an outer surface of the head portion is substantially flush with an outer surface of the window panel,
wherein the head portion comprises a second portion arranged and constructed to project towards the side wall when the molded article is received within the space so as to be retained in the space without contacting the side wall,
wherein the leg portion is arranged and constructed to extend from an inner side of the head portion toward the bottom wall alone the edge surface of the window panel when the molded article is received within the space, and wherein the engagement portion is arranged and constructed to extend from the leg portion in a direction opposite to the second portion of the head portion along an inner surface of the window panel when the molded article is received within the space, an elastic lip continuously extending from the molding body and arranged and constructed to partially elastically contact the window frame and to elastically deform when the molded article is received within the space, and a connecting strip continuously extending from the elastic lip, the connecting strip being integral and continuous with the head portion, wherein the connecting strip is arranged and constructed to upwardly force the head position when the elastic lip is elastically deformed so that the first portion is pressed against the chamfered portion of the window panel.

10. A window panel unit as defined in claim 9, wherein the engagement portion extends from the leg portion and includes a retainer surface that is arranged and constructed to be substantially parallel to the inner surface of the window panel, and wherein an adhesive layer is interleaved between at least one of (1) a peripheral edge surface of the window panel and the leg portion and (2) the inner surface of the window panel and the retainer surface of the engagement portion.

11. A window panel unit as defined in claim 9, wherein the molded article is attached to a peripheral edge of the window panel around a substantial portion of a perimeter of the window panel that includes a corner portion of the window panel.

* * * * *